United States Patent
Kim et al.

(10) Patent No.: US 9,730,182 B2
(45) Date of Patent: Aug. 8, 2017

(54) MOBILE TERMINAL AND METHOD OF CONTROLLING THE SAME

(71) Applicant: LG ELECTRONICS INC., Seoul (KR)

(72) Inventors: Mingoo Kim, Seoul (KR); Kwangjae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/846,207

(22) Filed: Sep. 4, 2015

(65) Prior Publication Data

US 2016/0119897 A1    Apr. 28, 2016

(30) Foreign Application Priority Data

Oct. 23, 2014 (KR) .................... 10-2014-0144365

(51) Int. Cl.
| | | |
|---|---|---|
| *H04W 4/14* | (2009.01) | |
| *H04M 1/725* | (2006.01) | |
| *H04W 68/04* | (2009.01) | |
| *G01C 21/36* | (2006.01) | |
| *H04M 11/00* | (2006.01) | |

(52) U.S. Cl.
CPC ........ *H04W 68/04* (2013.01); *G01C 21/3655* (2013.01); *G01C 21/3697* (2013.01); *H04M 1/72522* (2013.01); *H04M 1/72569* (2013.01); *H04M 11/00* (2013.01); *H04W 4/14* (2013.01)

(58) Field of Classification Search
CPC . H04W 4/14; G01C 21/3697; H04M 1/72522
See application file for complete search history.

(56) References Cited

U.S. PATENT DOCUMENTS

| 6,208,932 B1 | 3/2001 | Ohmura et al. |
| 2007/0042812 A1* | 2/2007 | Basir .................. H04M 1/6091 455/569.2 |

(Continued)

FOREIGN PATENT DOCUMENTS

| JP | 2000-065585 | 3/2000 |
| KR | 10-2004-0084682 | 10/2004 |
| KR | 10-0767494 | 10/2007 |

OTHER PUBLICATIONS

Extended European Search Report issued in European Application No. 15002104.6 on Mar. 11, 2016, 8 pages.

(Continued)

*Primary Examiner* — Asghar Bilgrami
(74) *Attorney, Agent, or Firm* — Fish & Richardson P.C.

(57) ABSTRACT

Disclosed are a mobile terminal capable of allowing a driver to drive a vehicle safely, by providing notification information related to the vehicle, and notification information received from the mobile terminal according to priorities, and a method of controlling the same. The mobile terminal includes: a communication unit; an output unit configured to output road guidance information; and a controller configured to detect first notification information related to a vehicle, to receive second notification information from a mobile terminal through the communication unit, to set priorities of the first and second notification information, and to output the first and second notification information to the output unit according to the set priorities.

23 Claims, 11 Drawing Sheets

(56) References Cited

U.S. PATENT DOCUMENTS

| | | | |
|---|---|---|---|
| 2008/0027643 A1* | 1/2008 | Basir | G01C 21/362 |
| | | | 701/469 |
| 2009/0216433 A1 | 8/2009 | Griesmer et al. | |
| 2011/0169632 A1 | 7/2011 | Walker et al. | |
| 2013/0031287 A1 | 1/2013 | Miyake | |
| 2013/0127614 A1* | 5/2013 | Velusamy | H04M 1/663 |
| | | | 340/539.11 |
| 2013/0184981 A1* | 7/2013 | Vogedes | G01C 21/3629 |
| | | | 701/400 |
| 2014/0007010 A1* | 1/2014 | Blom | G06F 3/011 |
| | | | 715/825 |
| 2014/0085107 A1* | 3/2014 | Gutierrez | G08G 1/096766 |
| | | | 340/905 |

OTHER PUBLICATIONS

Office Action issued in Korean Application No. 10-2014-0144365 on Nov. 23, 2015, 4 pages.

* cited by examiner

- SETTING OF NOTIFICATION INFORMATION DELAY TIME
  - ☐ 20 SECONDS    ☐ 15 SECONDS
  - ☑ 10 SECONDS    ☐ 7 SECONDS
  - ☐ 5 SECONDS     ☐ 3 SECONDS
  - ☐ 1 SECONDS     ☐ WHEN STOPPED

— 12-1

MOBILE TERMINAL AND METHOD OF CONTROLLING THE SAME

CROSS-REFERENCE TO RELATED APPLICATION

Pursuant to 35 U.S.C. §119(a), this application claims the benefit of earlier filing date and right of priority to Korean Application No. 10-2014-0144365, filed on Oct. 23, 2014, the contents of which is incorporated by reference herein in its entirety.

BACKGROUND OF THE INVENTION

1. Field of the Invention

The present invention relates to a mobile terminal and a method of controlling the same.

2. Background of the Invention

A terminal is broadly categorized by mobility into a mobile terminal and a stationary terminal. The mobile terminal is further categorized by portability into a handheld terminal and a vehicle-mounted terminal.

In response to an increasing demand for diversified functions, the terminal has been realized in the form of a multimedia player with multiple functions such as shooting a photographic object as a still image or moving images, reproducing digital audio and video compression files, playing a game, receiving a broadcast or the like.

SUMMARY OF THE INVENTION

Therefore, an aspect of the detailed description is to provide a mobile terminal capable of allowing a driver to drive a vehicle safely, by providing notification information related to the vehicle, and notification information received from the mobile terminal according to priorities, and a method of controlling the same.

To achieve these and other advantages and in accordance with the purpose of this specification, as embodied and broadly described herein, there is provided a mobile terminal, including: a communication unit; an output unit configured to output road guidance information; and a controller configured to detect first notification information related to a vehicle, to receive second notification information from a mobile terminal through the communication unit, to set priorities of the first and second notification information, and to output the first and second notification information to the output unit according to the set priorities.

In an embodiment of the present invention, the controller may change output orders of the first and second notification information based on the set priorities.

In an embodiment of the present invention, the first notification information may be turn-by-turn information, driving limit speed information, point of interest (POI) notification information, destination notification information, and overspeed notification information, and the second notification information may be notification information indicating a call signal, notification information indicating a short message service (SMS), and notification information indicating a social networking service (SNS).

In an embodiment of the present invention, the controller may set a priority of the first notification information to be higher than a priority of the second notification information.

In an embodiment of the present invention, if the second notification information is received while the first notification information is being output, the controller may delay output of the second notification information until the first notification information is completely output. After the delay, if the output of the first notification information is completed, the controller may output the second notification information through the output unit.

In an embodiment of the present invention, if the second notification information is received while the first notification information is being output through the output unit, the controller may delay output of the second notification information until the first notification information is completely output. After the delay, if a preset time lapses, the controller may output the second notification information through the output unit.

In an embodiment of the present invention, if the first and second notification information are simultaneously generated, the controller may delay output of the second notification information, and may output the first notification information through the output unit. After the output, if a preset time lapses, the controller may output the second notification information through the output unit.

In an embodiment of the present invention, the controller may detect an expected generation time of turn-by-turn information to be generated after a current time, from the first notification information. And the controller may output the second notification information through the output unit, based on the detected expected generation time.

In an embodiment of the present invention, the controller calculates a distance between the vehicle and a front vehicle, based on an image captured by a camera. And if the calculated distance is shorter than a preset distance, the controller may delay output of at least one of the first and second notification information.

In an embodiment of the present invention, the controller may output the first and second notification information with different sizes according to the priorities.

In an embodiment of the present invention, the controller may output notification voices corresponding to the first and second notification information with different sound levels according to the priorities.

In an embodiment of the present invention, the controller may endow scores to vehicle data included in the first notification information, may set a safe region and a dangerous region according to the scores, and may output the vehicle data included in the first notification information or delay the output according to the safe region or the dangerous region.

To achieve these and other advantages and in accordance with the purpose of this specification, as embodied and broadly described herein, there is also provided a method of controlling a mobile terminal, including: detecting first notification information related to a vehicle; receiving second notification information from a mobile terminal through the communication unit; setting priorities of the first and second notification information; and outputting the first and second notification information to the output unit according to the set priorities.

The present invention can have the following advantage.

In the mobile terminal and the method of controlling the same according to the present invention, notification information related to a vehicle, and notification information received from a mobile terminal are provided according to priorities. This can allow a vehicle driver to drive safely.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

The terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

The exemplary embodiments of the present invention will now be described with reference to the accompanying drawings, in which similar numbers refer to similar elements throughout.

Also, in describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings.

Figure 1:
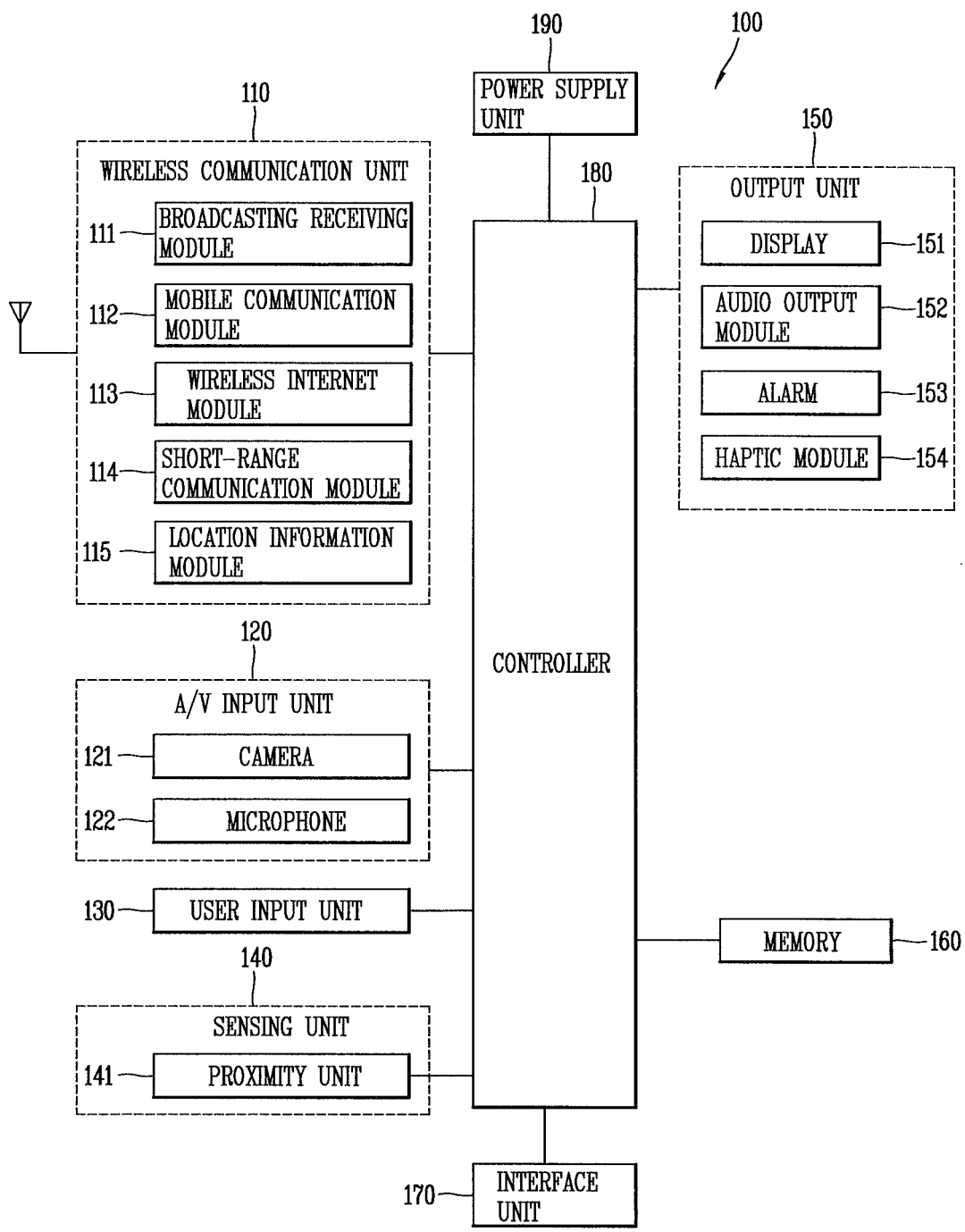
FIG. 1 is a block diagram illustrating a configuration of a mobile communication terminal according to embodiments of the present invention.

FIG. 1 is a view illustrating a configuration of a mobile communication terminal 100 according to embodiments of the present invention. The mobile communication terminal (i.e., a cellular phone or a mobile phone) 100 may be implemented in various forms such as mobile phones, smart phones, notebook computers, digital broadcast terminals, PDAs (Personal Digital Assistants), PMPs (Portable Multimedia Player), etc.

As illustrated in FIG. 1, the mobile communication terminal 100 includes a wireless communication unit 110, an AN (Audio/Video) input unit 120, a user input unit 130, a sensing unit 140, an output unit 150, a memory 160, an interface unit 170, a controller 180, and a power supply unit 190, etc. FIG. 1 shows the mobile communication terminal 100 having various components, but it is understood that implementing all of the illustrated components is not a requirement. The mobile communication terminal 100 may be implemented by greater or fewer components.

The wireless communication unit 110 typically includes one or more components allowing radio communication between the mobile communication terminal 100 and a wireless communication system or a network in which the mobile communication terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112. The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160 (or anther type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile communication terminal. This module may be internally or externally coupled to the terminal. Here, as the wireless Internet technique, a wireless local area network (WLAN), Wi-Fi, wireless broadband (WiBro), world interoperability for microwave access (Wi-MAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile communication terminal (when the mobile communication terminal is located in a vehicle, the location of the vehicle can be checked). For example, the location information module 115 may be embodied by using a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile communication terminal according to trigonometry on the basis of the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. As the location information module 115, a Wi-Fi position system and/or a hybrid positioning system may be used.

The A/V input unit 120 is configured to receive an audio or video signal. The A/V input unit 120 may include a camera 121 (or other image capture device) and a microphone 122 (or other sound pick-up device). The camera 121 processes image data of still pictures or video obtained by an image capturing device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile communication terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 (or other detection means) detects a current status (or state) of the mobile communication terminal 100 such as an opened or closed state of the mobile communication terminal 100, a location of the mobile communication terminal 100, the presence or absence of user contact with the mobile communication terminal 100 (i.e., touch inputs), the orientation of the mobile communication terminal 100, an acceleration or deceleration movement and direction of the mobile communication terminal 100, etc., and generates commands or signals for controlling the operation of the mobile communication terminal 100. For example, when the mobile communication terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The interface unit 170 (or other connection means) serves as an interface by which at least one external device may be connected with the mobile communication terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like. Here, the identification module may be a memory chip (or other element with memory or storage capabilities) that stores various information for authenticating user's authority for using the mobile communication terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection means. The interface unit 170 may be used to receive inputs (e.g., data, information, power, etc.) from an external device and transfer the received inputs to one or more elements within the mobile communication terminal 100 or may be used to transfer data within the mobile communication terminal to an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. The mobile terminal 100 may include two or more display units (or other display means) according to its particular desired embodiment. For example, the mobile terminal may include both an external display unit (not shown) and an internal display unit (not shown).

When the display unit 151 and the touch pad are overlaid in a layered manner to form a touch screen, the display unit 151 may function as both an input device and an output device. The touch sensor may have the form of, for example, a touch film, a touch sheet, a touch pad, and the like.

The touch sensor may be configured to convert the pressure applied to a particular portion of the display unit 151 or a change in capacitance generated at a particular portion of the display unit 151 into an electrical input signal. The touch sensor may be configured to detect a touch input pressure as well as a touch input position and a touch input area. When there is a touch input with respect to the touch sensor, the corresponding signal(s) are sent to a touch controller (not shown). The touch controller processes the signal(s) and transmits corresponding data to the controller 180. Accordingly, the controller 180 can recognize a touched region of the display unit 151.

A proximity sensor 141 may be may be disposed within the mobile terminal covered by the touch screen or near the touch screen. The proximity sensor 141 refers to a sensor for detecting the presence or absence of an object that accesses a certain detect surface or an object that exists nearby by using the force of electromagnetism or infrared rays without a mechanical contact. Thus, the proximity sensor 141 has a longer life span compared with a contact type sensor, and it can be utilized for various purposes.

The example of the proximity sensor 141 may be a transmission type photo sensor, a direct reflection type photo sensor, a mirror-reflection type photo sensor, an RF oscillation type proximity sensor, a capacitance type proximity sensor, a magnetic proximity sensor, an infrared proximity sensor. When the touch screen is an electrostatic type touch screen, an approach of the pointer is detected on the basis of a change in an electric field according to the approach of the pointer. In this case, the touch screen (touch sensor) may be classified as a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity sensor 141 detects a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be outputted to the touch screen.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile terminal 100. The audio output module 152 may include a receiver, a speaker, a to buzzer, etc.

The alarm unit 153 outputs a signal for informing about an occurrence of an event of the mobile terminal 100. Events generated in the mobile terminal may include call signal reception, message reception, key signal inputs, and the like. In addition to video or audio signals, the alarm unit 153 may output signals in a different manner, for example, to inform about an occurrence of an event. For example, the alarm unit 153 may output a signal in the form of vibration. When a call signal is received or a message is received, the alarm unit 153 may vibrate the mobile terminal through a vibration means. Or, when a key signal is inputted, the alarm unit 153 may vibrate the mobile terminal 100 through a vibration means as a feedback with respect to the key signal input. Through the vibration, the user may recognize the occurrence of an event. A signal for notifying about the occurrence of an event may be output to the display unit 151 or to the voice output module 152.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100. The haptic module 154 may be provided to a place which is frequently in contact with the user. For example, the haptic module 154 may be provided to a steering wheel, a gearshift, a lever, a seat, and the like.

The memory 160 may store software programs used for the processing and controlling operations performed by the controller 180, or may temporarily store data (e.g., a map data, phonebook, messages, still images, video, etc.) that are inputted or outputted.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like. Here, the identification module may be a chip that stores various types of information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port. The interface unit 170 may be used to receive inputs (e.g., data, information, power, etc.) from an external device and transfer the received inputs to one or more elements within the mobile terminal 100 or may be used to transfer data between the mobile terminal and an external device.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself. For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

The voice recognition module (voice recognition engine) recognizes a voice pronounced by the user and performs a corresponding function according to the recognized voice signal.

A navigation session applied to the mobile terminal 100 displays a route from a point of departure to a destination on map data.

Figure 2:
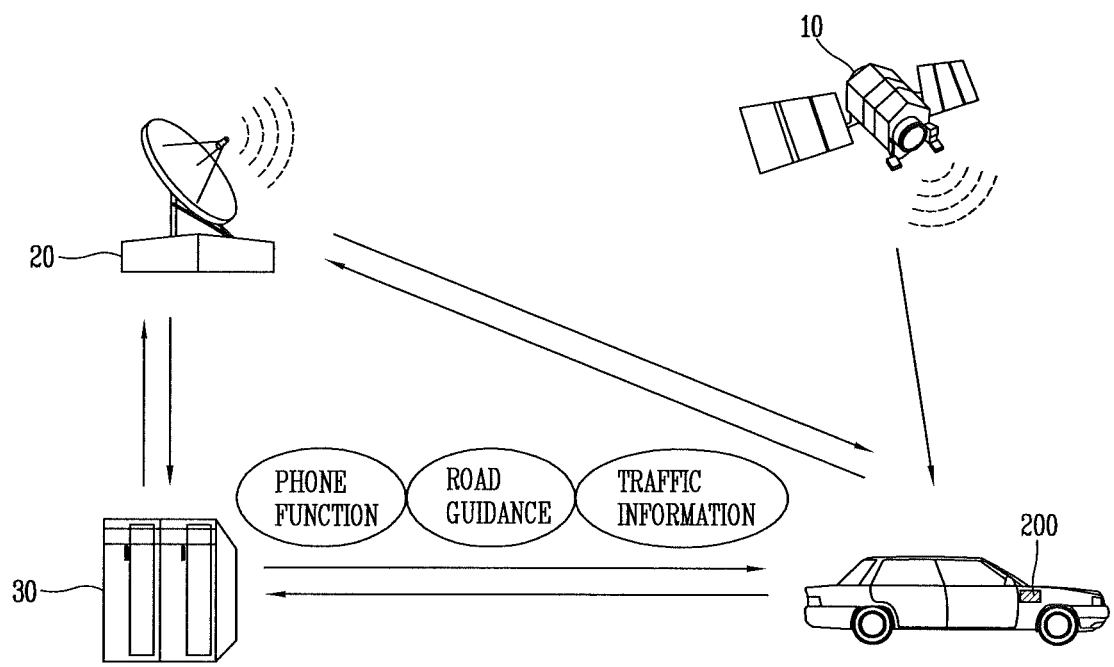
FIG. 2 is a block diagram illustrating a vehicle navigation system according to embodiments of the present invention.

FIG. 2 is a view illustrating a vehicle navigation system according to exemplary embodiments of the present disclosure.

As illustrated in FIG. 2, a vehicle navigation system includes an information providing center (server) 30 providing traffic information and various types of data (e.g. a program, an execution file, and the like); and a telematics terminal 200 mounted within a vehicle, receiving traffic information through a wide area wireless communication network 20 and/or a local area wireless communication network, and providing a road guidance service on the basis of an artificial satellite 10. Here, the communication network may further include a wired/wireless communication network such as a local area network (LAN) or a wide area network (WAN).

Through the communication network, various types of traffic information (e.g., road traffic information, information regarding a point of interest (POI)) including information regarding a traffic light, are collected, and the collected information is processed by an information providing center 30 (e.g., a server) according to a TPEG (Transport Protocol Expert Group) standard and transmitted to a broadcast station. Then, the broadcast station inserts the traffic information including the information regarding a traffic light into a broadcast signal and broadcasts the same to the telematices terminal 200 of the vehicle. The information providing center 30 (for example, a server) may transmit the traffic information to the telematics terminal 200 of the vehicle through the communication network.

The server reconfigures various types of traffic information, which are collected through various paths connected to the communication network, for example, according to an operator input, through the wired/wireless Internet, from digital broadcast services such as a TDC (Transparent Data Channel) or a MOC (Multimedia Object Transport), from a different server, or from a probe car, into a traffic information format such as a format in conformity with a TPEG (Transport Protocol Expert Group) standard, namely, for example, a standard for a traffic information service, and transmits the same to the broadcast station or the telematics terminal 200.

The server may generate a traffic information format on the basis of the TPEG standard including traffic light information, and transmit the same to the broadcast station. The traffic information may include traffic light information and may also include information regarding various traffic conditions required for vehicle driving in roads, sea traffic, airline flights, such as accidents, a road situation, traffic congestion, road construction, road blockage (or road closure), a public transportation network delay, air transportation holdup, and the like.

The broadcast station receives the processed traffic information including traffic light information from the server and transmits it through digital signals in conformity with various digital broadcast standards to the vehicle 200. In this case, the broadcast standards include a European digital audio broadcasting (DAB) standard on the basis of Eureca-147 [ETSI EN 300 401), a terrestrial or satellite digital multimedia broadcasting (DMB) standard, a terrestrial digital video broadcasting (DVB-T) standard, a mobile digital video broadcasting-handheld (DVB-H) standard, media forward link only (MFLO) standard, and the like.

Also, the broadcast station may transmit the traffic information including the traffic light information through a wired/wireless network such as the wired/wireless Internet.

The telematics terminal 200 receives traffic light information included in the traffic information and transfers the traffic light information to the user through graphics, text, and/or audio.

Hereinafter, the configuration of the telematics terminal 200 installed in a vehicle according to an exemplary embodiment of the present disclosure will be described with reference to FIG. 3.

Figure 3:
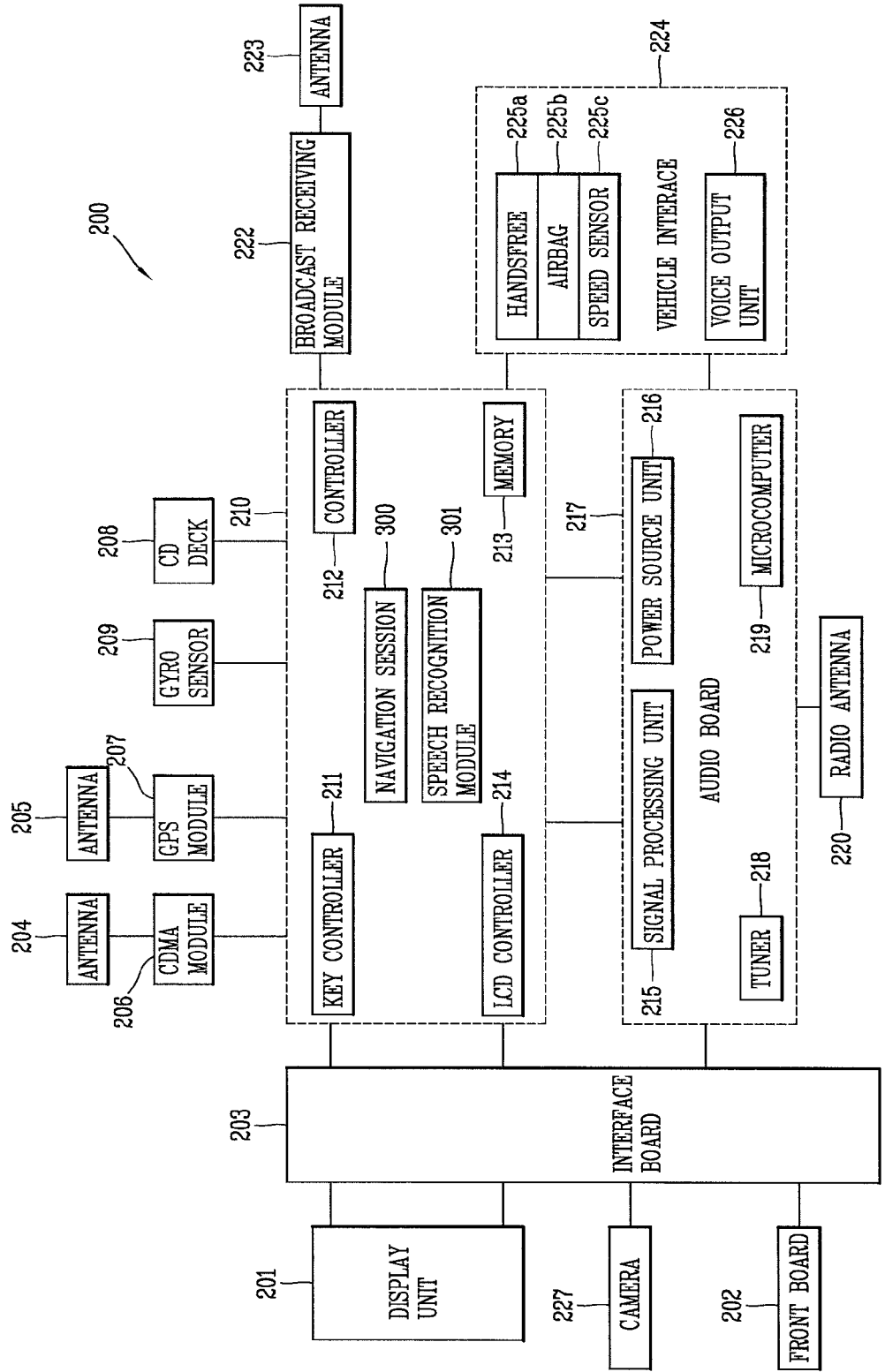
FIG. 3 is a block diagram illustrating a configuration of a telematics terminal (or head unit) according to embodiments of the present invention.

FIG. 3 is a schematic block diagram illustrating a configuration of a telematics terminal (or head unit) 200 according to exemplary embodiments of the present disclosure.

As illustrated in FIG. 3, the telematics terminal (or a head unit) 200 includes a main board 210 including a controller (e.g., a central processing unit (CPU)) for controlling the telematics terminal 200 on the whole, a memory 213 for storing various types of infotination, a key controller 211 for controlling various key signals, and a liquid crystal display (LCD) controller 214 for controlling an LCD.

The memory 213 stores map information (map data) for displaying road guidance information on a digital map. Also, the memory 213 stores a traffic information collecting control algorithm for inputting traffic information according to the situation of a road in which the vehicle currently travels (runs), and information for controlling the algorithm.

The telematics terminal (or head unit) 200 includes a communication unit 206 including a short-range communication unit (for example, Bluetooth™) and a remote communication unit (for example, a code division multiple access (CDMA) communication unit), a global position system (GPS) module 207 for guiding a location of the vehicle, receiving a GPS signal for tracking a travel route from a start point to a destination, or transmitting traffic information collected by the user, as a GPS signal, a CD deck 208 for reproducing a signal recorded in a CD (Compact Disk), a gyro sensor 209, and the like.

The communication unit 206 and the GPS module 207 may transmit and receive signals through antennas 204 and 205.

A broadcast receiving module 222 is connected with the main board 210 and receives a broadcast signal via an antenna 223. A display unit (i.e., an LCD) 201 under the control of the LCD controller 214, a front board 202 under the control of the key controller 211, and a camera 227 for capturing the interior and/or the exterior of a vehicle are connected to the main board 210 via an interface board 203. The display unit 201 displays various video signals and character signals, and the front board 202 includes buttons for various key signal inputs and provides a key signal corresponding to a button selected by the user to the main board 210. Also, the display unit 201 includes a proximity sensor and a touch sensor (touch screen) of FIG. 2.

The front board 202 includes a menu key for directly inputting traffic information. The menu key may be configured to be controlled by the key controller 211.

An audio board 217 is connected with the main board 210 and processes various audio signals. The audio board 217 includes a microcomputer 219 for controlling the audio board 217, a tuner 218 for receiving a radio signal, a power source unit 216 for supplying power to the microcomputer 219, and a signal processing unit 215 for processing various voice signals.

The audio board 217 also includes a radio antenna 220 for receiving a radio signal and a tape deck 221 for reproducing an audio tape. The audio board 217 may further include a voice output unit (e.g., an amplifier) 226 for outputting a voice signal processed by the audio board 217.

The voice output unit (amplifier) 226 is connected to a vehicle interface 224. Namely, the audio board 217 and the main board 210 are connected to the vehicle interface 224. A handsfree 225a for inputting a voice signal, an airbag 225b configured for the security of a passenger, a speed sensor 225c for detecting a speed of the vehicle, and the like, may be connected to the vehicle interface 224. The speed sensor 225c calculates a vehicle speed and provides the calculated vehicle speed information to the CPU.

The navigation session 300 applied to the telematics terminal 200 generates road guidance information on the basis of the map data and current location information of the vehicle and provides the generated road guidance information to a user.

The display unit 201 detects a proximity touch within a display window via a proximity sensor. For example, when a pointer (e.g., user's finger or a stylus) is proximity-touched, the display unit 201 detects the position of the proximity touch and outputs position information corresponding to the detected position to the controller 212.

A voice recognition module (or a voice recognition engine) 301 recognizes a voice pronounced by the user and performs a corresponding function according to the recognized voice signal.

The navigation session 300 applied to the telematics terminal 200 displays a travel route on map data, and when the location of the mobile terminal 100 is within a pre-set distance from a blind spot included in the travel route, the navigation session 300 automatically forms a wireless network with a terminal mounted in an adjacent vehicle (e.g., a vehicle navigation device) and/or a mobile communication terminal carried by a nearby pedestrian through wireless communication (e.g., a short-range wireless communication network), to receive location information of the adjacent vehicle from the terminal mounted in the adjacent vehicle and receive location information of the nearby pedestrian from the mobile communication terminal carried by the nearby pedestrian.

Figure 4:
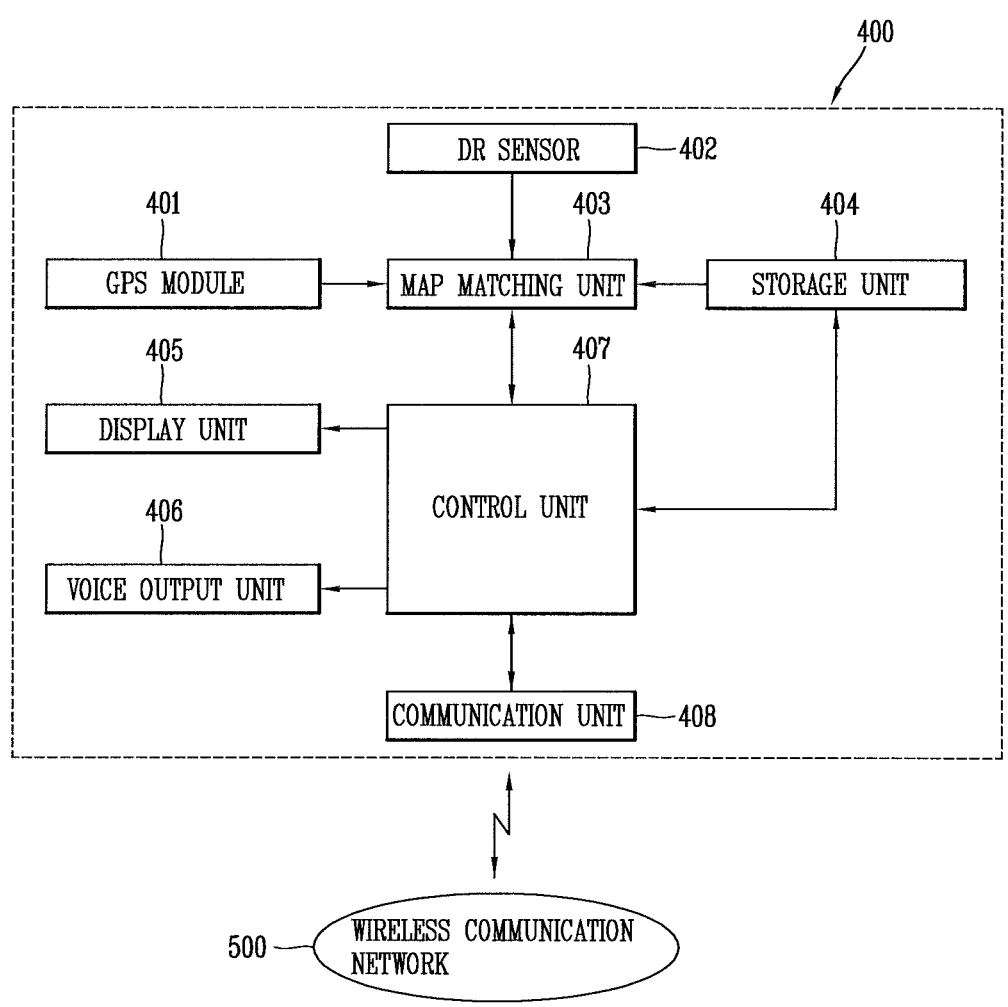
FIG. 4 is a block diagram illustrating a configuration of a navigation (vehicle navigation) device according to embodiments of the present invention.

FIG. 4 is a block diagram illustrating a configuration of a navigation (vehicle navigation) device 400 according to embodiments of the present invention.

The navigation (vehicle navigation) device 400 is categorized into an in-dash type and an on-dash type according to an installation type in the vehicle 200. The in-dash type navigation (vehicle navigation) device is insertion-fixed to a predetermined space allocated to a dash board of the vehicle 200. The on-dash type navigation (vehicle navigation) device is mounted on a dash board of the vehicle 200, or is installed near the dash board by using a predetermined supporting plate. Since the on-dash type navigation (vehicle navigation) device is detachably mounted, it may be separated from the vehicle 200 for portability.

The navigation (vehicle navigation) device 400 according to embodiments of the present invention includes not only the in-dash type and the on-dash type, but also an information processing device which can receive and/or process traffic information, e.g., various types of portable terminals which perform a navigation function by interworking with a GPS receiver for receiving a navigation message from a global positioning system (GPS) satellite in the vehicle 200.

As shown in FIG. 4, the navigation device 400 includes a GPS module 401 configured to receive a global positioning system (GPS) signal from a satellite, and configured to generate first vehicle position of the navigation device 400 (regarded to have the same position as the telematics terminal 200 or the mobile communication terminal 100) based on the received GPS signal; a dead-reckoning (DR) sensor 402 configured to generate second vehicle position data based on a driving direction of a vehicle and a speed of the vehicle; a storage unit (or memory) 404 configured to store therein map data and various information; a map matching unit 403 configured to generate a vehicle estimation position based on the first vehicle position data and the second vehicle position data, to match the generated vehicle estimation position with a link (a map matching link or a map matching road) included in the map data stored in the storage unit 404, and to output the matched map information (map matching result); a communication unit 408 configured to receive real-time traffic information from an information providing center and/or a nearby vehicle, through a wireless communication network 420, to receive traffic light information, and to perform a call; a controller 407 configured to generate road guidance information based on the matched map information (map matching result); a display unit 405 configured to display a road guidance map (including information on points of interest (POI)) and the traffic light information; and a voice output unit 406 configured to output road guidance voice information (road guidance voice message) included in the road guidance information, and a voice signal corresponding to the traffic light information.

The communication unit 408 further includes a hands-free device having a Bluetooth module, and may receive a broadcasting signal including traffic infatuation of a TPEG format from a broadcasting station through an antenna. The broadcasting signal includes video and audio data according to various standards such as terrestrial or satellite digital multimedia broadcasting (DMB), digital audio broadcasting (DAB) and digital video broadcasting (DVB-T, DVB-H), but also additional information such as traffic information for traffic information (TPEG) service and data information for binary format for scene (BIFS) service, and various types of additional data. Also, the communication unit 408 tunes a signal bandwidth to which traffic information is provided, demodulates the tuned signal, and outputs the demodulated signal to a TPEG decoder included in the controller 407.

The TPEG decoder decodes traffic information of a TPEG format, and provides, to the controller 407, various types of information such as traffic light information included in the traffic information.

The road guidance information may include not only map data, but also various types of information related to driving, such as lane information, driving limit speed information, turn-by-turn information, traffic safety information, traffic guidance information, vehicle information, and road search information.

A signal received through the GPS module 401, may provide position information of the mobile terminal to the navigation device 400, through wireless communication technology such as 802.11, 802.15, 802.16 and 802.20. IEEE 802.11 is a set of specifications for implementing wireless local area network (WLAN) computer communication proposed by the Institute of Electrical and Electronics Engineers (IEEE) LAN/MAN standards committee. IEEE 802.15 is a working group of the Institute of Electrical and Electronics Engineers (IEEE) IEEE 802 standards committee which specifies wireless personal area network (WPAN) standards such as Bluetooth, UWB and Zigbee. IEEE 802.16 is a series of wireless broadband standards written by the Institute of Electrical and Electronics Engineers (IEEE), standards for wireless metropolitan area network broadband wireless access (MAN BWA) such as metropolitan broadband networks (fixed wireless access: FWA). IEEE 802.20 or Mobile Broadband Wireless Access (MBWA) is a specification by the standard association of the Institute of Electrical and Electronics Engineers (WEE) for mobile wireless Internet access networks such as Wibro and WiMAX.

The navigation device 400 may further include an input unit. The input unit, configured to select a user's desired function or to input information, may be implemented as a keypad, a touch screen, a jog shuttle, a microphone, etc.

The map matching unit 403 is configured to generate a vehicle estimation position based on the first position data and the second position data, and reads map data corresponding to a driving path, from the storage unit 404.

The map matching unit 403 is configured to match the vehicle estimation position with links (roads) included in the map data, and to output the matched map information (map matching result) to the controller 407. For instance, the map matching unit 403 generates a vehicle estimation position based on the first position data and the second position data, and matches the generated vehicle estimation position with links included in the map data stored in the storage unit 404, in order of links. Then, the map matching unit 403 outputs the matched map information (map matching result) to the controller 407. The map matching unit 403 may output, to the controller 407, road attribute information included in the matched map information (map matching result), such as a single-story road or a double-story road. The function of the map matching unit 403 may be executed by the controller 407.

The storage unit 404 is configured to store map data therein. The map data includes geographic coordinates indicating a latitude and a longitude in the unit of degree/minute/second (DMS). The map data may include universal transverse Mercator (UTM) coordinates, universal polar system (UPS) coordinates, transverse Mercator (TM) coordinates, etc., as well as the geographic coordinates.

The storage unit 404 stores therein various types of menu screens, points of interest (POIs), and various types of information such as function characteristic information according to a specific position of map data.

The storage unit 404 stores therein various user interfaces (UIs) and/or graphic user interfaces (GUIs).

The storage unit 404 stores therein data, programs, etc. required to operate the navigation device 400.

The storage unit 404 stores therein destination information input by a user through the input unit. The destination information may indicate either a destination, or a starting point and a destination.

The display unit 405 displays video information (or a road guidance map) included in road guidance information generated by the controller 407. The display unit 405 includes a touch sensor (touch screen) and a proximity sensor. The road guidance information may include not only map data, but also various types of information related to driving, such as lane information, driving limit speed information, turn-by-turn information, traffic safety information, traffic guidance information, vehicle information, and road search information.

When displaying the video information, the display unit 405 may display various menu screens and various content such as road guidance information, by using a user interface and/or a graphic user interface included in the storage unit 404. The content displayed on the display unit 405 includes various texts or image data (including map data or various types of information data), a menu screen including data such as icons, a list menu and a combo box, and so on.

The voice output unit 406 outputs voice information included in road guidance information generated by the controller 407, or a voice message with respect to the road guidance information. The voice output unit 406 may be implemented as an amplifier or a speaker.

The controller 407 generates road guidance information based on the matched map information, and outputs the generated road guidance information to the display unit 405 and the voice output unit 406. The display unit 405 displays the road guidance information.

The controller 407 generates road guidance information by receiving real-time traffic information from the information providing center and/or a terminal mounted to a peripheral vehicle (vehicle navigation device).

The controller 407 may perform a call by being connected to a call center through the communication unit 408, or may transmit/receive information between the navigation device 400 and the call center. The communication unit 408 further includes a hands-free module having a Bluetooth function using a short-range wireless communication method.

Once a POI search menu is selected by a user, the controller 407 searches for POIs positioned on a path from a current position to a destination, and displays the searched POIs on the display unit 405. The controller 407 searches for a POI positioned on the path (i.e., a point searched without change (research) of the path, e.g., a POI positioned on the left or right side of a road) and/or a POI positioned near the path (i.e., a point searched after change of the path, e.g., a point searched after change of a preset path so as to pass through a nearby POI), and displays the searched POI(s) on the display unit 405.

Figure 5:
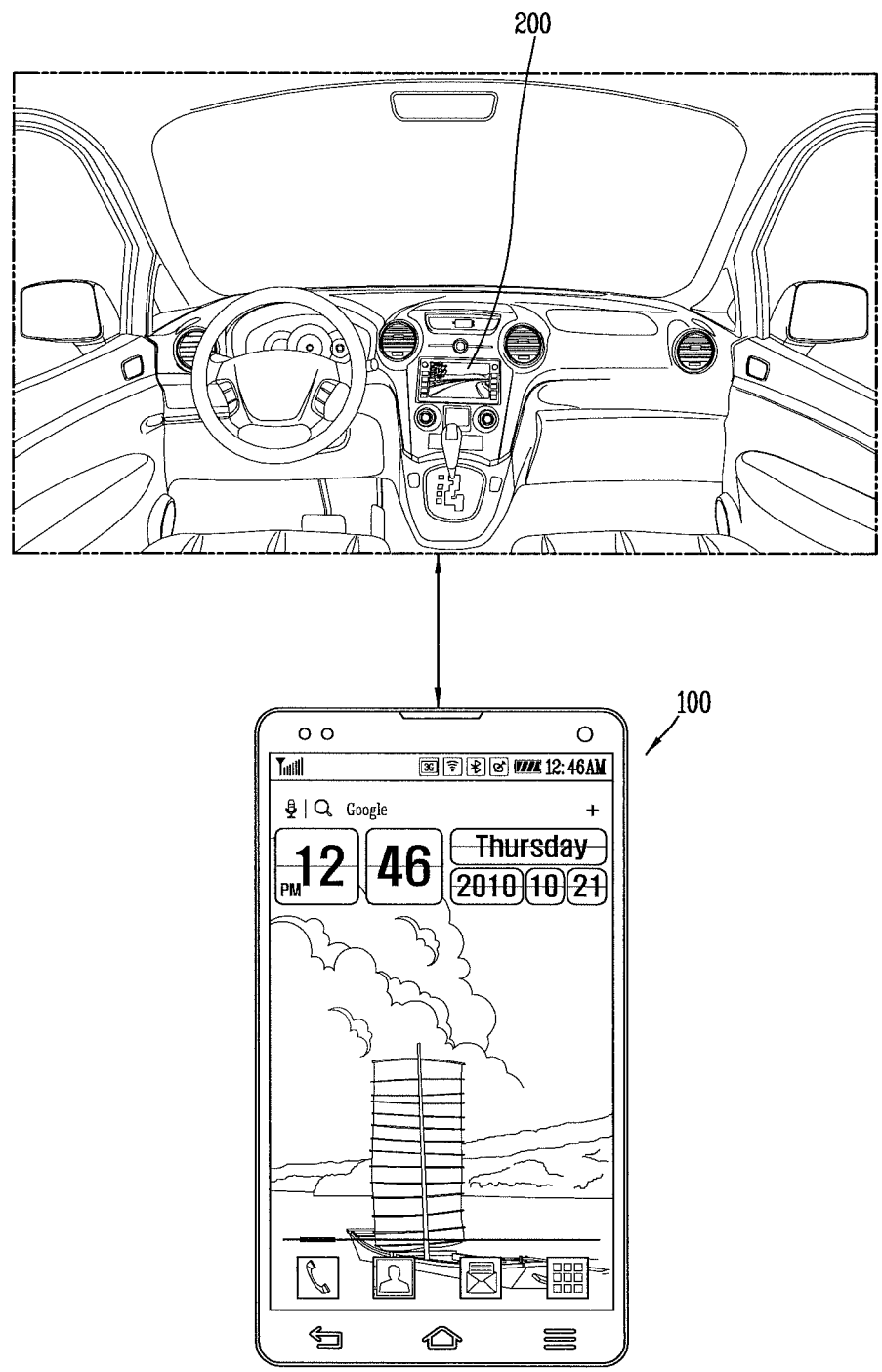
FIG. 5 is a view illustrating a mobile terminal connected to a telematics terminal (or head unit) according to embodiments of the present invention.

FIG. 5 is a view illustrating a mobile terminal connected to a telematics terminal (or head unit) 200 according to embodiments of the present invention.

As shown in FIG. 5, the mobile terminal 100 may be connected to the telematics terminal (or head unit) 200 through a wired or wireless communication network. As the telematics terminal 200, a notebook computer, a tablet personal computer (PC), etc. may be used.

Instead of the telematics terminal 200, the navigation device 400 may be used. Instead of the mobile terminal 100, a notebook computer, a digital broadcasting terminal, a personal digital assistant (PDA), a portable multimedia player (PMP), a tablet personal computer (tablet PC), etc. may also be used.

The mobile terminal 100 and the telematics terminal 200 may be connected to each other by wire or wirelessly to form a virtual network computing (VNC) system. As the VNC system is formed, a user may control the mobile terminal 100 using the telematics terminal 200, or may control the telematics terminal 200 using the mobile terminal 100.

Hereinafter, the present invention will be explained in an assumption that the telematics terminal 200 (e.g., tablet PC) is the mobile terminal.

The mobile terminal 200 is mountable or detachable to/from a dash board of a vehicle. Once the mobile terminal 200 is mounted to the dash board of the vehicle, a general mode of the mobile terminal 200 is automatically converted into a vehicle mode (vehicle screen mode), and a plurality of content inside the mobile terminal are displayed on the display unit 201 of the mobile terminal 200 under restrictions on vehicle driving. When mounted to the dash board of the vehicle, the mobile terminal 200 is connected to an electronic controller (ECU) of the vehicle.

Figure 6:
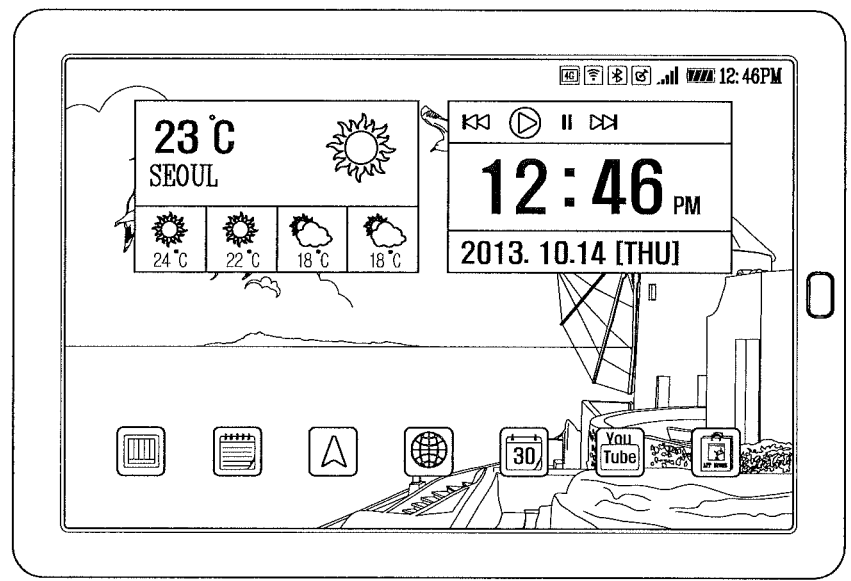
FIG. 6 is an exemplary view illustrating a general mode of a mobile terminal.

FIG. 6 is an exemplary view illustrating a general mode of a mobile terminal.

As shown in FIG. 6, the mobile terminal 200 displays various content (icons of application programs) on a screen regardless of vehicle restrictions in a general mode, and executes the content according to a user's request. If a navigation application program is executed by a user in a general mode, the mobile terminal 100 displays pedestrian navigation information not vehicle navigation information, on the screen.

In the vehicle mode (vehicle screen mode), the mobile terminal 200 receives vehicle information from the vehicle, synchronizes the received vehicle information with personal information and mobile information of a server, and displays the synchronized information. When detached from the vehicle, the mobile terminal 200 automatically converts the vehicle mode into the general mode, and records information on a driving record of the vehicle.

Hereinafter, a method of controlling the mobile terminal according to embodiments of the present invention will be explained.

Firstly, the controller 212 determines whether the mobile terminal 200 has been mounted to the vehicle. For instance, once the mobile terminal 200 is connected to an electronic controller (ECU) of the vehicle through a wired or wireless communication network, the controller 212 determines that the mobile terminal 200 has been mounted to the vehicle.

The mobile terminal 200 may further include a sensing unit (not shown) configured to sense a connected state of the mobile terminal 200 with the vehicle. For instance, the sensing unit may sense whether the mobile terminal 200 has been connected to the electronic controller (ECU) of the vehicle, or a port of the ECU of the vehicle, and may output a sensing signal to the controller 212 to thus generate a notification signal indicating that the mobile terminal 100 has been connected to the vehicle. Then, the mobile terminal 200 may display the notification signal on the display unit 151. The sensing unit (not shown), configured to sense a connected state between the mobile terminal 200 and the vehicle, may be operated automatically or manually.

Once the mobile terminal 200 is mounted to the vehicle, the controller 212 may display navigation data (map data) installed in the mobile terminal 200, on the display unit 201.

Once the mobile terminal 200 is mounted to the vehicle, the controller 212 receives pre-registered identification information on a vehicle driver (e.g., universally unique identifier, UUID) from the ECU of the vehicle.

The controller 212 authenticates the mobile terminal 200, based on the pre-registered identification information on a vehicle driver (e.g., universally unique identifier, UUID) received from the ECU of the vehicle, and identification information registered to the memory 213 (e.g., universally unique identifier, UUID). For instance, if the received pre-registered identification information on a vehicle driver matches the identification information registered to the memory 213, the controller 212 allows information exchange between the mobile terminal 200 and the ECU of the vehicle.

The controller 212 may authenticate the mobile terminal 200 based on the pre-registered identification information on a vehicle driver, the identification information registered to the memory 213, and personal information pre-registered to a server (e.g., an ID and a password registered by a user of the mobile terminal).

Once the mobile terminal 200 is authenticated, the controller 212 receives vehicle information from the ECU of the vehicle. The vehicle information may include information on conditioning equipment of the vehicle (e.g., temperature level information of a heater or an air conditioner), engine oil amount information, engine temperature information, tire pneumatic pressure information, battery information, radio channel setting information, information on a current speed of the vehicle, information on revolution per minute (RPM) of the vehicle, information on a steering angle of the vehicle, information on driving a brake of the vehicle, etc.

The controller 212 detects content corresponding to personal information among a plurality of content of the mobile terminal. The content corresponding to personal information may include a schedule application program (scheduler), a social networking service (SNS) application program (Facebook, Kakao talk, Twitter, Youtube, etc.), an email application program, a phone book application program, a moving image application program, etc. The content corresponding to personal information may further include a media application program.

The controller 212 implements a vehicle mode (vehicle screen mode), based on the content corresponding to personal information among a plurality of content of the mobile terminal, vehicle information and navigation information. Then, the controller 212 displays the vehicle mode on the display unit 201. The content corresponding to personal information may be synchronized with a server and/or a user's cellular phone.

Figure 7:
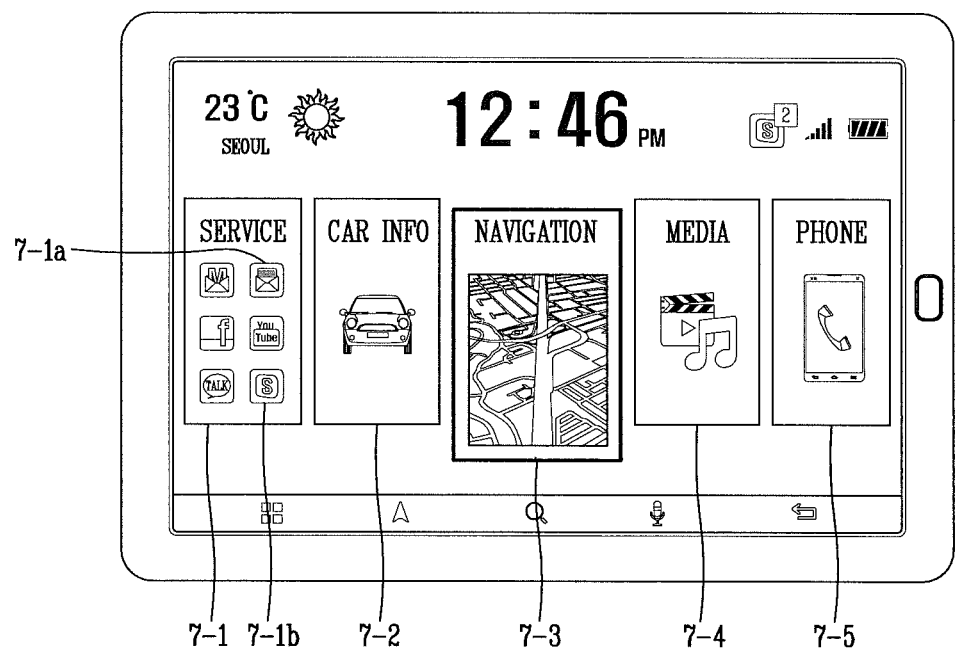
FIG. 7 is an exemplary view illustrating a vehicle mode displayed on a mobile terminal according to embodiments of the present invention.

FIG. 7 is an exemplary view illustrating a vehicle mode displayed on a mobile terminal according to embodiments of the present invention.

As shown in FIG. 7, the vehicle mode (vehicle screen mode) includes a first region 7-1 for displaying content corresponding to personal information among a plurality of content of the mobile terminal, a second region 7-2 for displaying vehicle information, and a third region 7-3 for displaying navigation information indicating a path from a current position to a destination.

The vehicle mode (vehicle screen mode) may further include a fourth region 7-4 for displaying media data (e.g., film, music video, drama, etc.), and a fifth region 7-5 for displaying an icon for a call. Once the icon for a call is selected by a user, the controller 212 performs a call.

If an email icon 7-1a is selected from the first region 7-1 for displaying content corresponding to personal information among a plurality of content of the mobile terminal, the controller 212 executes an application program corresponding to the selected email icon 7-1a, thereby displaying email content on the first region 7-1. If the email icon 7-1a is selected when the vehicle is running, the controller 212 converts email content corresponding to the selected email icon 7-1a into a voice signal, and outputs the voice signal through the voice output unit 226.

If a schedule icon 7-1b is selected from the first region 7-1 for displaying content corresponding to personal information, the controller 212 executes an application program corresponding to the selected schedule icon 7-1b, thereby displaying schedule content on the first region 7-1. If the schedule icon 7-1b is selected when the vehicle is running, the controller 212 converts schedule content corresponding to the selected schedule icon 7-1b into a voice signal, and outputs the voice signal through the voice output unit 226.

If the second region 7-2 for displaying vehicle information is selected, the controller 212 may display at least one of information on conditioning equipment of the vehicle (e.g., temperature level information of a heater or an air conditioner), engine oil amount information, engine temperature information, tire pneumatic pressure information, battery information, radio channel setting information, etc., on the second region 7-2 or an entire region of the display unit 201.

In the mobile terminal and the method of controlling the same according to the present invention, when a user mounts the mobile terminal to the vehicle, a general mode of the mobile terminal is automatically converted into a vehicle mode. This can allow the user to check the vehicle mode rapidly and easily.

In the mobile terminal and the method of controlling the same according to the present invention, when a user mounts the mobile terminal to the vehicle, a vehicle mode (vehicle screen mode) is displayed based on the content corresponding to personal information among a plurality of content of the mobile terminal, vehicle information and navigation information. This can allow the user to check a personal vehicle mode.

In the mobile terminal and the method of controlling the same according to the present invention, when a user mounts a mobile terminal to a vehicle, a vehicle mode (vehicle screen mode) is displayed based on the content corresponding to personal information among a plurality of content of the mobile terminal, vehicle information and navigation information. Further, when the vehicle is running, the content corresponding to personal information among a plurality of content of the mobile terminal in the vehicle mode is changed under restrictions on vehicle driving, and then is output. This can allow a driver of the vehicle to drive safely.

The telematics terminal (or a head unit) 200 mounted to the vehicle may be connected to a plurality of mobile communication terminals inside the vehicle, and the plurality of mobile communication terminals may be connected to each other through a wireless or wired communication network. The telematics terminal 200 may be used by a vehicle driver, and the plurality of mobile communication terminals 100 may be used by vehicle passenger(s).

Instead of the telematics terminal 200, a navigation device or the mobile communication terminal 100 may be used. Instead of the plurality of mobile communication terminals 100, a plurality of rear seat entertainment systems (RSEs), a plurality of cellular phones, a plurality of smartphones, a plurality of notebook computers, a plurality of digital broadcasting terminals, a plurality of personal digital assistants (PDAs), a plurality of portable multimedia players (PMPs), a plurality of tablet personal computers (PCs), and the like, may also be used. Hereinafter, the telematics terminal 200 and one or more mobile communication terminals 100 will be described as an example.

The telematics terminal 200 interworks with a plurality of terminals within a vehicle and easily, and rapidly receives an application program desired by a user from the plurality of terminals and execute the received application program, thereby effectively using information (for example, an application program, content, data, and the like) stored in each of the plurality of terminals.

The mobile communication terminal 100 interworks with the telematics terminal 200 within the vehicle and other mobile communication terminals within the vehicle, easily and rapidly receives an application program desired by a user from the telematics terminal 200 and the other mobile communication terminals, and executes the received application program, thereby effectively using information (for example, an application program, content, data, and the like) stored in each of the plurality of terminals.

That is, since the plurality of terminals may exchange mutual information with each other within the vehicle, only an apparatus and a method thereof will be explained. In the apparatus and the method, the telematics terminal 200 interworks with a plurality of terminals within a vehicle and an application program desired by a user is easily and rapidly received from the plurality of terminals and executed, so that the user can easily and effectively use information (for example, an application program, content, data, and the like) stored in each of the plurality of terminals.

Hereinafter, a method of controlling a mobile terminal according to an embodiment of the present invention will be explained.

Figure 8:
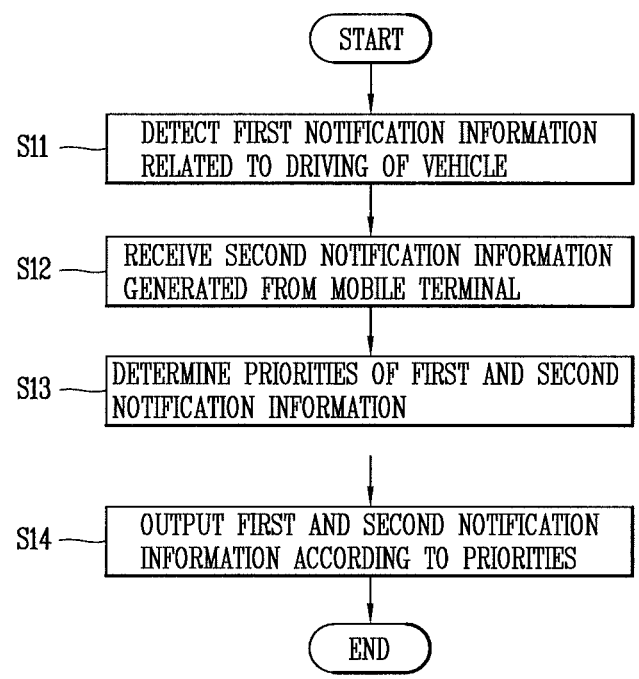
FIG. 8 is a flowchart illustrating a method of controlling a mobile terminal according to an embodiment of the present invention.

FIG. 8 is a flowchart illustrating a method of controlling a mobile terminal according to an embodiment of the present invention.

The controller 212 generates road guidance information indicating a path from a current position to a destination, and displays the generated road guidance information on the display unit 201. Then, the controller 212 outputs voice information corresponding to the generated road guidance information, through the voice output unit 226.

The controller 212 real-time detects first notification information related to driving of a vehicle, while the road guidance information is being output (S11). The first notification information may be turn-by-turn information, driving limit speed information, point of interest (POI) notification information, destination notification information, overspeed notification information, etc.

The controller 212 real-time receives second notification information generated from the mobile terminal 100, while the road guidance information is being output (S12). The second notification information may be notification information indicating an incoming call or a short message service (SMS) (text reception), notification information indicating a social networking service (SNS), etc.

Before outputting the first and second notification information to the display unit 201 and/or the voice output unit 226, the controller 212 determines priorities of the first and second notification information, so as to determine output orders of the first and second notification information (S13). That is, the controller 212 sets the first notification information to have a higher priority than the second notification information, for safe driving of the vehicle.

The controller 212 outputs the first and second notification information to the display unit 201 and/or the voice output unit 226 according to the set priorities (S14). For instance, if the second notification information is received while the first notification information is being output to the display unit 201 and/or the voice output unit 226, the controller 212 delays output of the second notification information until the first notification information is completely output. Then, if the output of the first notification information is completed, the controller 212 outputs the second notification information to the display unit 201 and/or the voice output unit 226.

More specifically, if the second notification information (e.g., information indicating an SMS message) is received while the first notification information (e.g., information indicating left turn) is being output to the display unit 201 and/or the voice output unit 226, the controller 212 may delay output of the second notification information until the first notification information is completely output. Then, if a preset time (e.g., 10 seconds) lapses, the controller 212 may output the second notification information to the display unit 201 and/or the voice output unit 226.

If the first and second notification information are simultaneously generated, the controller 212 may delay output of the second notification information, and may output the first notification information to the display unit 201 and/or the voice output unit 226. Then, if a preset time (e.g., 10 seconds) lapses, the controller 212 may output the second notification information to the display unit 201 and/or the voice output unit 226.

If the first notification information is detected while the second notification information is being output to the display unit 201 and/or the voice output unit 226, the controller 212 may temporarily stop the output of the second notification information, and then may output the first notification information to the display unit 201 and/or the voice output unit 226.

If the second notification information is received while the first notification information is being output to the display unit 201 and/or the voice output unit 226, the controller 212 may delay output of the second notification information until the first notification information is completely output. Then, the controller 212 calculates a spare time from a termination time when the first notification information is completely output (e.g., 3:50:10 pm (hours, minutes, seconds: H/M/S), to an expected generation time of next first notification information subsequent to the first notification information (e.g., 3:50:30 pm (H/M/S). If the detected spare time is longer than an output time (play time) of the second notification information, the controller 212 outputs the second notification information after the first notification information is completely output. On the contrary, if the detected spare time is shorter than the output time (play time) of the second notification information, the controller 212 delays output of the second notification information. Then, the controller 212 outputs the second notification information when the detected spare time is longer than the output time of the second notification information.

Figure 9A:
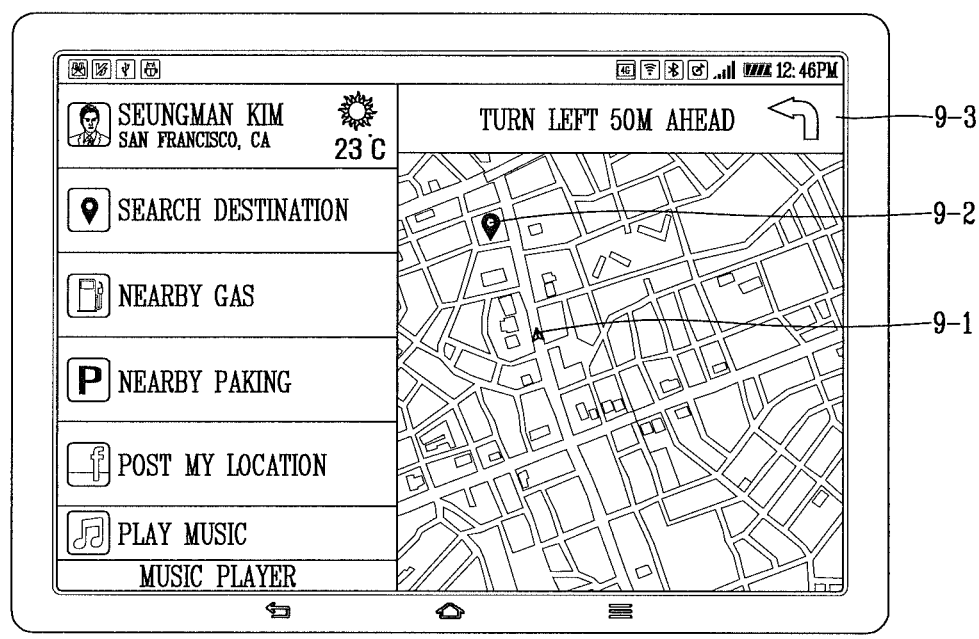
FIGS. 9A and 9B are exemplary views illustrating notification information according to the present invention.
Figure 9B:
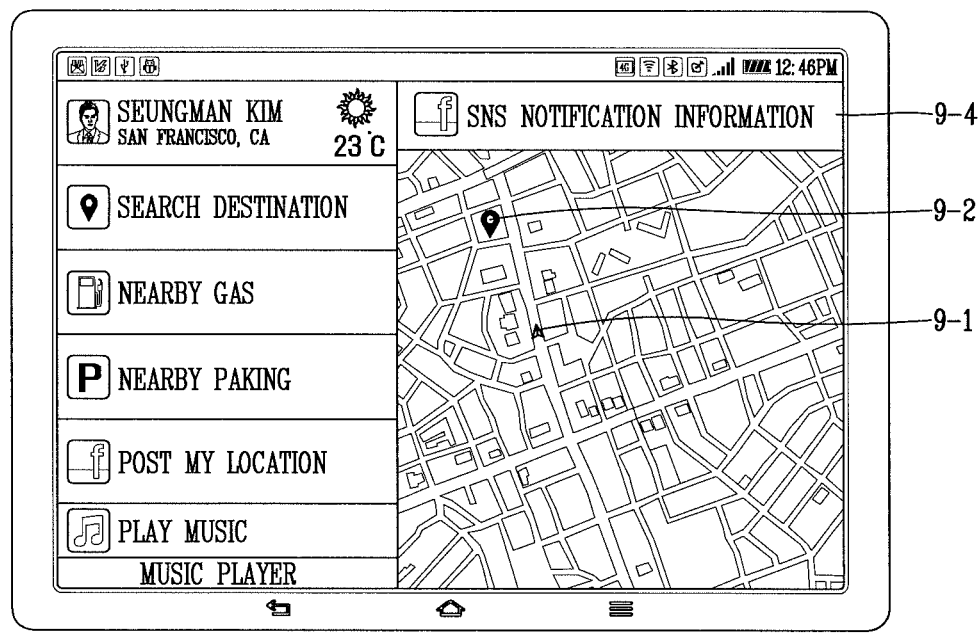

FIGS. 9A and 9B are exemplary views illustrating notification information according to the present invention.

As shown in FIGS. 9A and 9B, if second notification information 9-4 is received while road guidance information (first notification information) 9-3 (e.g., turn-by-turn information) corresponding to a path from a current position 9-1 to a destination 9-2 is being output, the controller 212 delays output of the second notification information 9-4 until the first notification information 9-3 is completely output. Then, if the output of the first notification information 9-3 is completed, the controller 212 outputs the second notification information 9-4 to the display unit 201 and/or the voice output unit 226.

The controller 212 may generate a vibration signal corresponding to the first and/or second notification information, and may output the vibration signal to a motor part installed at a steering wheel of the vehicle.

The controller 212 may capture a front side of the vehicle using a camera mounted to the vehicle (e.g., black box) and/or the camera 227, and may calculate a distance between the vehicle and a front vehicle. If the calculated distance is shorter than a preset distance, the controller 212 may not output the first and/or second notification information. For instance, an interval between the current vehicle and a front vehicle is small an interval corresponding to a current driving speed, the controller 212 may not output the first and/or second notification information temporarily.

The controller 212 may set turn-by-turn information among the first notification information related to driving of the vehicle, with a highest priority. And the controller 212 may set notification information about data on various types of sensors of the vehicle, notification information about a driving speed, notification information indicating whether to backward move or not, notification information about a handle steering angle, notification information about sudden acceleration, notification information about sudden stop, etc., with a lower priority than the second notification information.

The controller 212 may simultaneously output the first and second notification information to the display unit 201 and/or the voice output unit 226, according to a type of the first notification information and a type of the second notification information. For instance, in an assumption that the first notification information is turn-by-turn information and the second notification information is a message reception voice, the controller 212 may simultaneously output the turn-by-turn information and the message reception voice to the display unit 201 and/or the voice output unit 226.

The controller 212 may display the notification information on the display unit 201, after controlling a size of notification information having a higher priority (e.g., turn-by-turn image) to be larger than a size of notification information having a lower priority (e.g., SNS notification image).

The controller 212 may display the notification information on the display unit 201, such that a position of notification information having a higher priority (e.g., turn-by-turn image) is different from a position of notification information having a lower priority (e.g., SNS notification image).

The controller 212 may output notification voices corresponding to the first and second notification information with different sound levels according to the priorities. For instance, the controller 212 may output notification information having a higher priority (e.g., turn-by-turn image) with a higher sound level than notification information having a lower priority (e.g., SNS notification image).

Hereinafter, a method of managing the first and second notification information will be explained with reference to FIG. 10.

Figure 10:
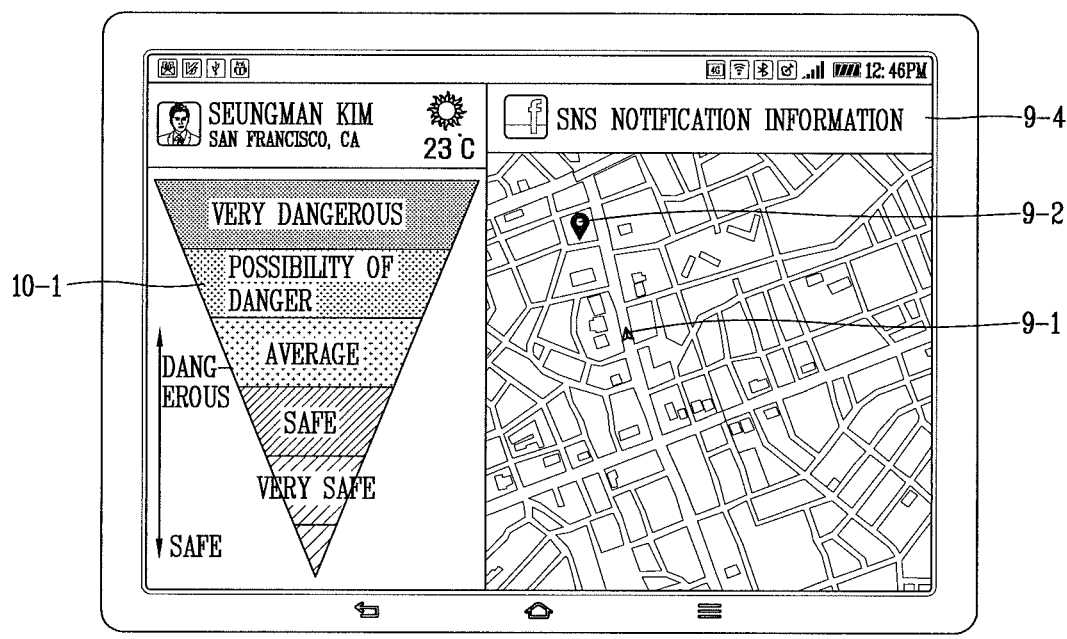
FIG. 10 is an exemplary view illustrating a method of managing first notification information according to the present invention.

FIG. 10 is an exemplary view illustrating a method of managing first notification information according to the present invention.

As shown in FIG. 10, the controller 212 displays, on the display unit 201, an image 10-1 indicating the degree of danger of the first and/or second notification information while the vehicle is running. And the controller 212 outputs the first and/or second notification information according to the degree of danger of the first and/or second notification information, or delays the output.

For instance, the controller 212 endows scores to vehicle data included in the first notification information (e.g., turn-by-turn information, driving limit speed information, point of interest (POI) notification information, destination notification information, overspeed notification information, vehicle steering angle information, etc.), and sets a safe region and a dangerous region according to the scores. And the controller 212 may output the vehicle data included in the first notification information (e.g., turn-by-turn information, driving limit speed information, point of interest (POI) notification information, destination notification information, overspeed notification information, vehicle steering angle information, etc.) or may delay the output, according to the safe region or the dangerous region. For instance, if data negative to safe driving of the vehicle is detected from vehicle data included in the first is notification information, the controller 212 increases a danger score (risk index). As the danger score is increased, the current region is changed from a safe region to a dangerous region step by step.

If a current area corresponds to a very dangerous area having a high danger score, the controller 212 prevents or delays output of all notification information, except for notification information (guide information) necessary to drive the vehicle.

The controller 212 may real-time detect vehicle steering angle information from the first notification information, and may set the degree of safety and the degree of danger to the safe region and the dangerous region according to the vehicle steering angle information. For instance, when the vehicle steering angle information is 0°, the controller 212 may display a mark of "very safe" on the safe region. When the vehicle steering angle information is 5°, the controller 212 may display a mark of "safe" on the safe region. When the vehicle steering angle information is 10°, the controller 212 may display a mark of "average" on the safe region. When the vehicle steering angle information is 15°, the controller 212 may display a mark of "dangerous" on the dangerous region. When the vehicle steering angle information exceeds 15°, the controller 212 may display a mark of "very dangerous" on the dangerous region.

If the vehicle steering angle information is 10° or less, the controller 212 outputs the first notification information without delay. However, if the vehicle steering angle information exceeds 15°, the controller 212 delays output of the first notification information.

The controller 212 may generate the second notification information differently according to a current state of the vehicle (e.g., stopped state, forward-running state or a backward-running state). For instance, if the vehicle is forward-running, the controller 212 may output the second notification information only in the form of a voice. However, if the vehicle is in a stopped state, the controller 212 may display the second notification information on the display unit 201, and may output the second notification information in the form of a voice.

The controller 212 may set a type of notification information to be received from the mobile terminal 100 according to a user input, which will be explained with reference to FIG. 11.

Figure 11:
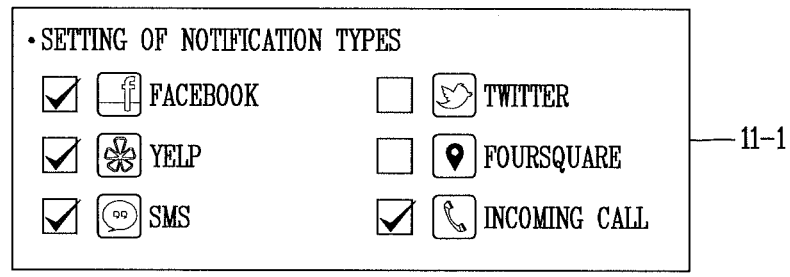
FIG. 11 is an exemplary view illustrating a method of setting a type of notification information to be received from a mobile terminal.

FIG. 11 is an exemplary view illustrating a method of setting a type of notification information to be received from a mobile terminal.

As shown in FIG. 11, the controller 212 displays notification information (second notification information) setting window 11-1 on the display unit 201 according to a user's request, and sets only notification types selected by a user among a plurality of notification types included in the notification information setting window 11-1. Then, the controller 212 receives, from the mobile terminal 100, only notification information corresponding to the set notification types. When the mobile terminal 100 is connected to the telematics terminal (or head unit) 200, the controller 212 may set the set notification types to the mobile terminal 100 (automatic synchronization). The setting of notification types may be executed in the mobile terminal 100.

The controller 212 may set a delay time of the second notification information, which will be explained with reference to FIG. 12.

Figures 12, 13:
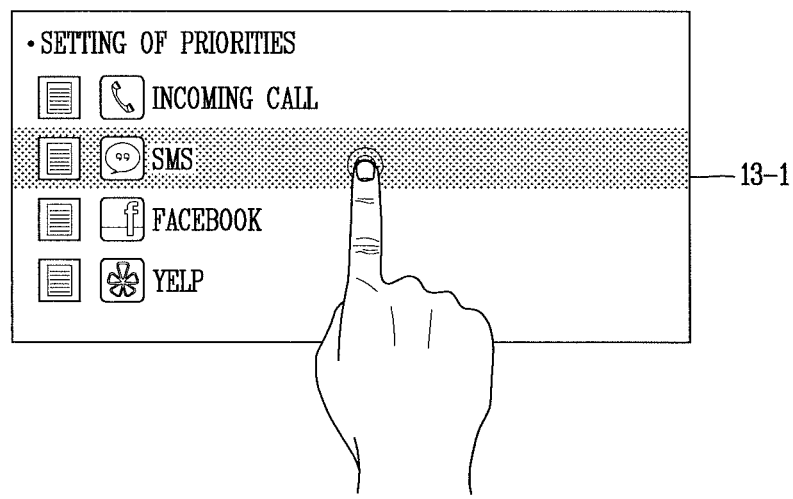
FIG. 12 is an exemplary view illustrating a method of setting delay time of notification information which has been received from a mobile terminal.
FIG. 13 is an exemplary view illustrating a method of setting priorities of notification information to be received from a mobile terminal.

FIG. 12 is an exemplary view illustrating a method of setting a delay time of notification information which has been received from a mobile terminal.

As shown in FIG. 12, the controller 212 displays notification information (second notification information) delay time setting window 12-1 on the display unit 201 according to a user's request, and delays the notification information (second notification information) for a delay time selected by a user among a plurality of delay times included in the notification information delay time setting window 12-1. For instance, when the first notification information (vehicle notification) and the second notification information (mobile notification) are generated simultaneously or at similar time points, the controller 212 firstly outputs the first notification information, and delays output of the second notification information for the selected delay time (e.g., 10 seconds). Then, the controller 212 outputs the second notification information.

The controller 212 may set priorities of the first and/or second notification information according to a user input, which will be explained with reference to FIG. 13.

FIG. 13 is an exemplary view illustrating a method of setting priorities of notification information to be received from a mobile terminal.

As shown in FIG. 13, the controller 212 displays notification information (second notification information) priority setting window 13-1 on the display unit 201 according to a user's request, and sets display orders of a plurality of notifications included in the notification information priority setting window 13-1 according to a user input. Then, the controller 212 automatically sets priorities of the plurality of notifications according to the display orders. For instance, in an assumption that first to fourth notifications have been sequentially displayed on the notification information priority setting window 13-1, if the fourth notification is displayed on an uppermost region of the notification information priority setting window 13-1 according to a user input, the controller 212 automatically sets the fourth notification with a highest priority. On the contrary, if the first notification is displayed on a lowermost region of the notification information priority setting window 13-1 according to a user input, the controller 212 automatically sets the first notification with a lowest priority.

The controller 212 may set priorities of the first and/or second notification information according to a user input, which will be explained with reference to FIG. 14.

Figure 14:
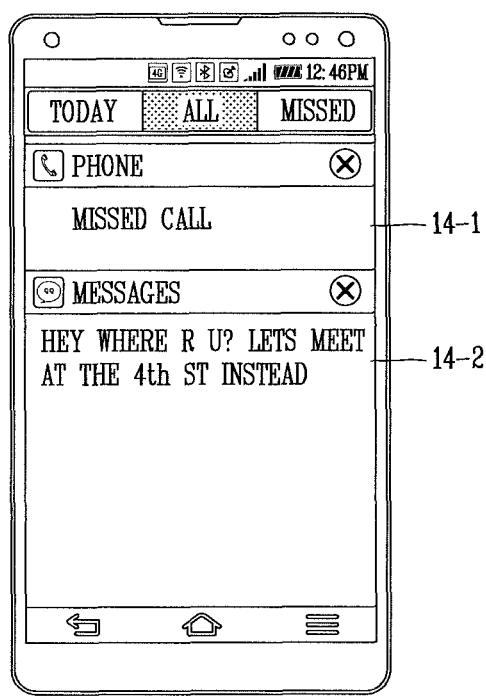
FIG. 14 is an exemplary view illustrating another method of setting priorities of notification information to be received from a mobile terminal.

FIG. 14 is an exemplary view illustrating another method of setting priorities of notification information to be received from a mobile terminal.

As shown in FIG. 14, when the vehicle is in a stopped state or the vehicle has reached a destination, the controller 212 may provide, to the mobile terminal 100, an incoming call which has not been checked while the vehicle is running (missed call), an SMS notification, etc. For instance, when the vehicle is in a stopped state or the vehicle has reached a destination, the controller 212 may provide a missed notification 14-1, a received notification 14-2, etc. to the mobile terminal 100 in a distinguished manner As aforementioned, in the mobile terminal and the method of controlling the same according to the present invention, notification information related to a vehicle, and notification information received from a mobile terminal are provided according to priorities. This can allow a vehicle driver to drive safely.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a camera;
a communication unit;
an output unit configured to output road guidance information; and
a controller configured to:
 detect first notification information related to a vehicle,
 receive second notification information from another mobile terminal through the communication unit,
 set priorities related to the first notification information and the second notification information, and
 output, using the output unit, the first notification information and the second notification information according to the set priorities,
wherein the controller is configured to output the first notification information and the second notification information according to the set priorities by changing an output order of the first notification information and the second notification information based on the set priorities, and
wherein the controller is configured to:
 calculate a distance between the vehicle and another vehicle in front of the vehicle based on an image captured by the camera; and
 delay output of at least one of the first notification information or the second notification information based on the calculated distance being shorter than a preset distance.

2. The mobile terminal of claim 1, wherein the first notification information is turn-by-turn navigation information, driving speed limit information, point of interest (POI)

notification information, destination notification information, and overspeed notification information, and
  wherein the second notification information is notification information indicating a call signal, notification information indicating a short message service (SMS) message, and notification information indicating social networking service (SNS) activity.

3. The mobile terminal of claim 2, wherein the controller is configured to set a first priority of the first notification information to be higher than a second priority of the second notification information.

4. The mobile terminal of claim 3, wherein the controller is configured to temporarily stop output of the second notification information and output the first notification information based on detection of the first notification information while the second notification information is being output and the first priority of the first notification information being higher than the second priority of the second notification information.

5. The mobile terminal of claim 1, wherein the controller is configured to delay output of the second notification information until the first notification information is completely output based on the second notification information being received while the first notification information is being output, and
  wherein the controller is configured to output, after the delay, the second notification information through the output unit.

6. The mobile terminal of claim 1, wherein the controller is configured to delay output of the second notification information until the first notification information is completely output based on the second notification information being received while the first notification information is being output through the output unit, and
  wherein the controller is configured to output, after the delay, the second notification information through the output unit at a preset time after the first notification information output is complete.

7. The mobile terminal of claim 1, wherein the controller is configured to delay output of the second notification information and output the first notification information through the output unit based on the first notification information and the second notification information being simultaneously generated, and
  wherein the controller is configured to output, after the delay, the second notification information through the output unit at a preset time after the first notification information output is complete.

8. The mobile terminal of claim 1, wherein the controller is configured to detect, from the first notification information, an expected generation time of turn-by-turn navigation information to be generated after a current time, and
  wherein the controller is configured to output the second notification information through the output unit based on the detected expected generation time.

9. The mobile terminal of claim 1, wherein the controller is configured to output the first notification information and the second notification information with different sizes according to the priorities.

10. The mobile terminal of claim 1, wherein the controller is configured to output audio notification information corresponding to the first notification information and the second notification information with different sound levels according to the priorities.

11. The mobile terminal of claim 1, wherein the controller is configured to assign scores to vehicle data included in the first notification information, set a safe region and a dangerous region according to the scores, and output the vehicle data included in the first notification information or delay the output of the vehicle data included in the first notification information according to the safe region or the dangerous region.

12. The mobile terminal of claim 1, wherein the controller is configured to delay output of the second notification information until the first notification information is completely output based on the second notification information being received while the first notification information is being output,
  wherein the controller is configured to calculate a spare time from a termination time when the first notification information is completely output, to an expected generation time of next first notification information subsequent to the first notification information,
  wherein the controller is configured to output the second notification information after the first notification information is completely output based on the detected spare time being longer than an output time of the second notification information, and
  wherein the controller is configured to continue to delay output of the second notification information based on the detected spare time being shorter than the output time of the second notification information.

13. A method of controlling a mobile terminal, comprising:
  detecting first notification information related to a vehicle;
  receiving second notification information from another mobile terminal through a communication unit of the mobile terminal;
  setting priorities related to the first notification information and the second notification information; and
  outputting, using an output unit of the mobile terminal, the first notification information and the second notification information according to the set priorities,
  wherein outputting the first notification information and the second notification information comprises changing an output order of the first notification information and the second notification information based on the set priorities, and
  wherein outputting the first notification information and the second notification information comprises:
    calculating a distance between the vehicle and another vehicle in front of the vehicle based on an image captured by a camera; and
    delaying output of at least one of the first notification information or the second notification information based on the calculated distance being shorter than a preset distance.

14. The method of claim 13, wherein the first notification information is turn-by-turn navigation information, driving speed limit information, point of interest (POI) notification information, destination notification information, and overspeed notification information, and
  wherein the second notification information is notification information indicating a call signal, notification information indicating a short message service (SMS) message, and notification information indicating social networking service (SNS) activity.

15. The method of claim 14, wherein setting priorities related to the first notification information and the second notification information comprises setting a first priority of the first notification information higher than a second priority of the second notification information.

16. The method of claim 15, wherein outputting the first notification information and the second notification information comprises temporarily stopping output of the second notification information and then outputting the first notification information based on the first notification information being detected while the second notification information is being output.

17. The method of claim 13, wherein outputting the first notification information and the second notification information comprises:
   delaying output of the second notification information until the first notification information is completely output based on the second notification information being received while the first notification information is being output; and
   outputting, after the delay, the second notification information through the output unit.

18. The method of claim 13, wherein outputting the first notification information and the second notification information comprises:
   delaying output of the second notification information until the first notification information is completely output based on the second notification information being received while the first notification information is being output through the output unit, and
   outputting, after the delay, the second notification information through the output unit at a preset time after the first notification information output is complete.

19. The method of claim 13, wherein outputting the first notification information and the second notification information comprises:
   delaying output of the second notification information and outputting the first notification information through the output unit based on the first notification information and the second notification information being simultaneously generated; and
   outputting, after the delay, the second notification information through the output unit after the first notification information output is complete.

20. The method of claim 13, wherein outputting the first notification information and the second notification information comprises:
   detecting, from the first notification information, an expected generation time of turn-by-turn navigation information to be generated after a current time, and
   outputting the second notification information through the output unit based on the detected expected generation time.

21. The method of claim 13, wherein outputting the first notification information and the second notification information comprises outputting the first notification information and the second notification information with different sizes according to the priorities.

22. The method of claim 13, wherein outputting the first notification information and the second notification information comprises outputting audio notification information corresponding to the first notification information and the second notification information with different sound levels according to the priorities.

23. The method of claim 13, wherein outputting the first notification information and the second notification information comprises:
   assigning scores to vehicle data included in the first notification information;
   setting a safe region and a dangerous region according to the scores; and
   outputting the vehicle data included in the first notification information or delaying the output of the vehicle data included in the first notification information according to the safe region or the dangerous region.

* * * * *